US012798613B2

(12) United States Patent
Boggaram et al.

(10) Patent No.: US 12,798,613 B2
(45) Date of Patent: Nov. 17, 2026

(54) SYSTEMS AND METHODS OF DYNAMIC MULTI-TASK LEARNING FOR AUTONOMOUS DRIVING

(71) Applicant: Torc Robotics, Inc., Blacksburg, VA (US)

(72) Inventors: Achyut Sarma Boggaram, Cedar Park, TX (US); Nicolas Jourdan, Darmstadt (DE)

(73) Assignee: Torc Robotics, Inc., Blacksburg, VA (US)

( * ) Notice: Subject to any disclaimer, the term of this patent is extended or adjusted under 35 U.S.C. 154(b) by 128 days.

(21) Appl. No.: 19/014,900

(22) Filed: Jan. 9, 2025

(65) Prior Publication Data

US 2026/0192822 A1 Jul. 9, 2026

(51) Int. Cl.
*B60W 60/00* (2020.01)
*G06N 3/0499* (2023.01)

(52) U.S. Cl.
CPC ......... *B60W 60/001* (2020.02); *G06N 3/0499* (2023.01); *B60W 2556/10* (2020.02); *B60W 2556/20* (2020.02)

(58) Field of Classification Search
None
See application file for complete search history.

(56) References Cited

U.S. PATENT DOCUMENTS 10,474,790 B2 11/2019 Sun et al.
10,627,823 B1 4/2020 Kim et al.
10,768,626 B2 9/2020 Sun et al.
11,281,232 B2 3/2022 Mahmoud et al.
11,328,214 B2 5/2022 Mukherjea et al.
11,657,266 B2 5/2023 Yang et al.
11,755,008 B2 9/2023 Cesafsky et al.
11,873,005 B2 1/2024 Altman
11,884,302 B2 1/2024 Rus et al.
(Continued)

OTHER PUBLICATIONS

Natan et al., End-to-End Autonomous Driving With Semantic Depth Cloud Mapping and Multi-Agent, Jan. 2023, IEEE, pp. 1-15 (Year: 2023).*

(Continued)

*Primary Examiner* — Justin S Lee
(74) *Attorney, Agent, or Firm* — Armstrong Teasdale LLP

(57) ABSTRACT

An autonomy computing system of an autonomous vehicle is provided. The at least one processor of the autonomy computing system is programmed to receive sensor data of an environment, and generate, via an autonomous driving machine learning model, control policies based on the sensor data. The at least one processor is further programmed to generate the control policies by detecting, via an encoder of the autonomous driving machine learning model, features in the environment based on the sensor data, generating, via the one or more perception decoders of the autonomous driving machine learning model, perceptions of the environment based on the features, and generating, via the control policy decoder of the autonomous driving machine learning model, the control policies based on the features and the perceptions. In addition, the at least one processor is programmed to control operation of the autonomous vehicle according to the control policies.

20 Claims, 12 Drawing Sheets

(56) References Cited

U.S. PATENT DOCUMENTS

| | | | |
|---|---|---|---|
| 12,050,468 B2 | 7/2024 | Cserna et al. | |
| 12,099,782 B2 | 9/2024 | Meltz et al. | |
| 12,654,738 B1 * | 6/2026 | Pasternak | B60W 60/001 |
| 2021/0200230 A1 | 7/2021 | Ross | |
| 2021/0248460 A1 | 8/2021 | Sykora et al. | |
| 2022/0147847 A1 | 5/2022 | Mguni et al. | |
| 2022/0197236 A1 | 6/2022 | Krawiec et al. | |
| 2022/0222889 A1 * | 7/2022 | Bhargava | G06N 3/04 |
| 2023/0202529 A1 | 6/2023 | Cui et al. | |
| 2024/0025452 A1 | 1/2024 | Pendleton et al. | |
| 2024/0078455 A1 | 3/2024 | Jorgensen | |
| 2024/0103522 A1 * | 3/2024 | Djuric | G06V 20/56 |
| 2024/0111585 A1 | 4/2024 | Melchior et al. | |
| 2024/0157979 A1 | 5/2024 | Jiang et al. | |
| 2024/0199083 A1 * | 6/2024 | Chang | B60W 50/0097 |
| 2024/0249125 A1 * | 7/2024 | Castaneda Garcia-Rozas | G06N 3/08 |
| 2025/0189663 A1 * | 6/2025 | Kim | G01S 13/89 |
| 2025/0242835 A1 * | 7/2025 | Huo | B60W 30/0953 |
| 2025/0356641 A1 * | 11/2025 | Ravi Kumar | G06V 10/803 |
| 2026/0116398 A1 * | 4/2026 | Johnander | B60W 50/0097 |

OTHER PUBLICATIONS

Amini et al., Variational Autoencoder for End-to-End Control of Autonomous Driving with Novelty Detection and Training Debiasing, Oct. 1, 2018, IEEE, p. 1-8 (Year: 2018).*

* cited by examiner

FIG. 4
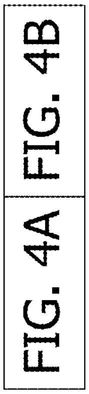
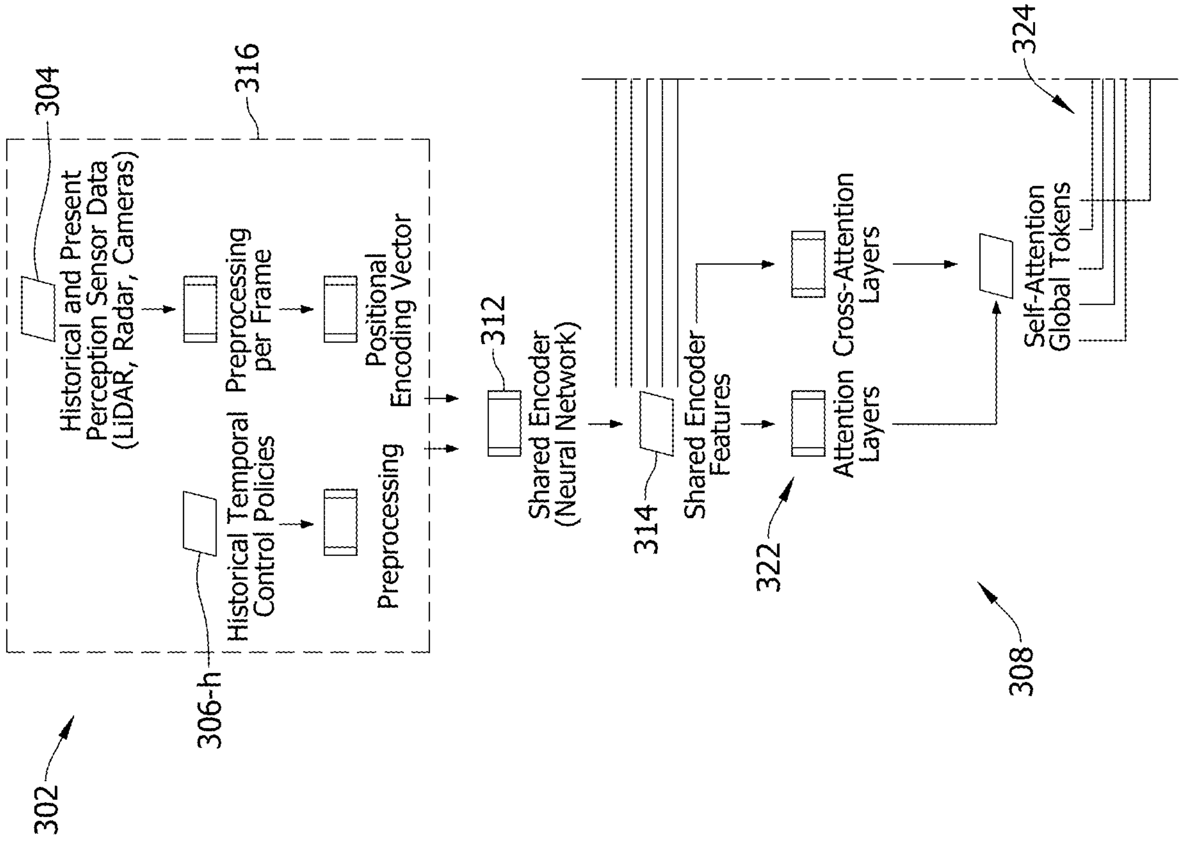
FIG. 4A

SYSTEMS AND METHODS OF DYNAMIC MULTI-TASK LEARNING FOR AUTONOMOUS DRIVING

TECHNICAL FIELD

The field of the disclosure relates generally to autonomous vehicles and, more specifically, to multi-task learning for autonomous driving.

BACKGROUND OF THE INVENTION

An autonomous vehicle relies on its autonomy computing system to perceive the environment in which the autonomous vehicle is operating or traveling, and plan and control the operation of the autonomous vehicle in the environment. The autonomy computing system includes one or more machine learning models. Typically, features in the environment are detected first to provide perceptions of the environment and control policies are generated based on the perceptions. The sequential method of autonomous driving does not provide a cohesive solution to autonomous driving, where different perceptions, such as detections of traffic signs and detections of objects, are predicted separately, and control policies are determined separately from perceptions, typically after detections of perceptions, while the perceptions and control policies are for the same environment. Accordingly, it is desirable to provide systems and methods for improved autonomous driving.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, an autonomy computing system of an autonomous vehicle is provided. The autonomy computing system includes at least one processor in communication with at least one memory device. The at least one processor is programmed to receive sensor data of an environment in which an autonomous vehicle is operating. The at least one processor is also programmed to generate, via an autonomous driving machine learning model, control policies based on the sensor data. The autonomous driving machine learning model includes an encoder stage and a decoder stage, the encoder stage including an encoder, the decoder stage including a plurality of decoders, the plurality of decoders including one or more perception decoders and a control policy decoder. The at least one processor is further programmed to generate the control policies by detecting, via the encoder, features in the environment based on the sensor data, generating, via the one or more perception decoders, perceptions of the environment based on the features, and generating, via the control policy decoder, the control policies based on the features and the perceptions. The control policy decoder is configured to take the features and the perceptions as inputs and output the control policies. In addition, the at least one processor is programmed to control operation of the autonomous vehicle according to the control policies.

In another aspect, a multi-agent system for developing an autonomous vehicle is provided. The multi-agent system includes a plurality of agents, at least one of the plurality of agents including an autonomy computing system of an autonomous vehicle. The autonomy computing system is configured to interact with other agents in the plurality of agents. The autonomy computing system includes at least one processor in communication with at least one memory device. The at least one processor is programmed to receive sensor data of an environment in which the autonomous vehicle is operating. The at least one processor is also programmed to generate, via an autonomous driving machine learning model, control policies based on the sensor data. The autonomous driving machine learning model includes an encoder stage and a decoder stage, the encoder stage including an encoder, the decoder stage including a plurality of decoders, the plurality of decoders including one or more perception decoders and a control policy decoder. The at least one processor is further programmed to generate the control policies by detecting, via the encoder, features in the environment based on the sensor data, generating, via the one or more perception decoders, perceptions of the environment based on the features, and generating, via the control policy decoder, the control policies based on the features and the perceptions. The control policy decoder is configured to take the features and the perceptions as inputs and output the control policies. In addition, the at least one processor is programmed to control operation of the autonomous vehicle according to the control policies.

In one more aspect, one or more non-transitory machine-readable storage media for an autonomy computing system of an autonomous vehicle are provided. The one or more non-transitory machine-readable storage media include a plurality of instructions stored thereon that, in response to being executed, cause a system to receive sensor data of an environment in which an autonomous vehicle is operating. The plurality of instructions further cause the system to generate, via an autonomous driving machine learning model, control policies based on the sensor data. The autonomous driving machine learning model includes an encoder stage and a decoder stage, the encoder stage including an encoder, the decoder stage including a plurality of decoders, the plurality of decoders including one or more perception decoders and a control policy decoder. The plurality of instructions further cause the system to generate the control policies by detecting, via the encoder, features in the environment based on the sensor data, generating, via the one or more perception decoders, perceptions of the environment based on the features, and generating, via the control policy decoder, the control policies based on the features and the perceptions. The control policy decoder is configured to take the features and the perceptions as inputs and output the control policies. In addition, the plurality of instructions cause the system to control operation of the autonomous vehicle according to the control policies.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 4 with partial views FIGS. 4A and 4B show a schematic diagram of the autonomy computing system shown in FIG. 3 with increased details. The approximate relationship between the partial views of FIGS. 4A and 4B is provided by FIG. 4.

Figure 1:
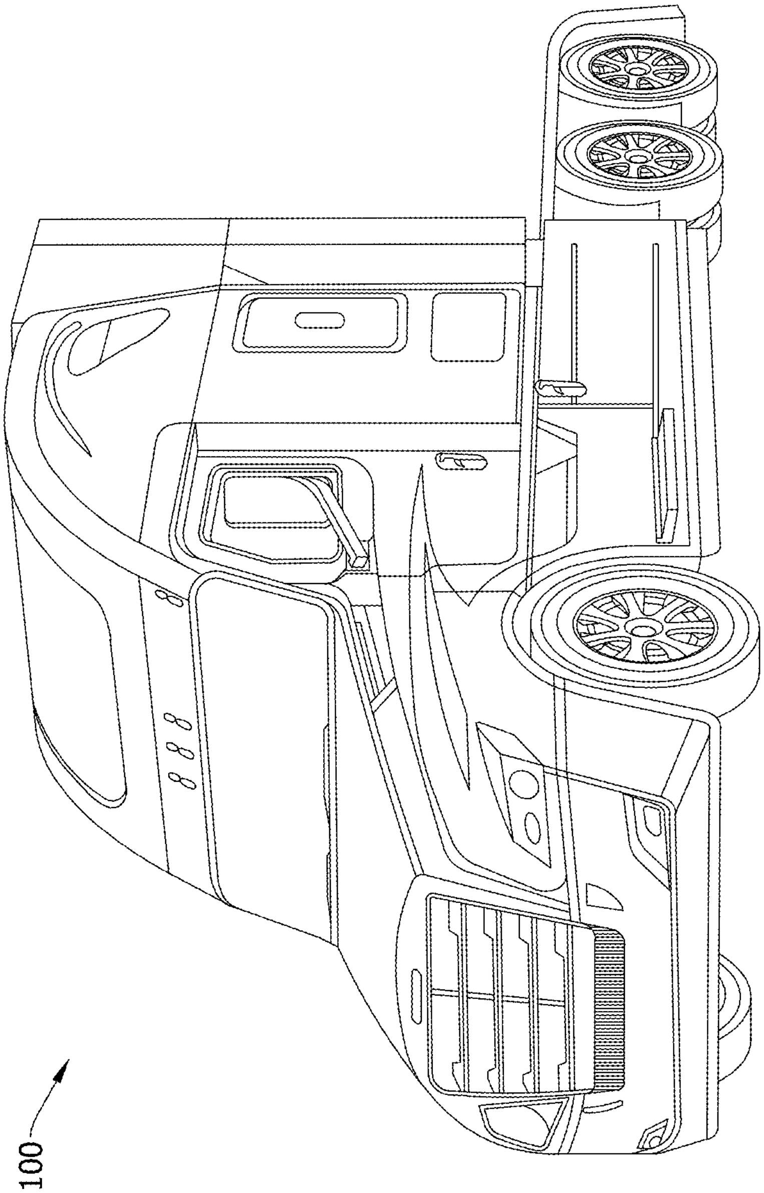
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing. The drawings are not to scale unless otherwise noted.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The disclosed systems and methods are described, for clarity, using certain terminology when referring to and describing relevant components within the disclosure. Where possible, common industry terminology is employed in a manner consistent with its accepted meaning. Unless otherwise stated, such terminology should be given a broad interpretation consistent with the context of the present application and the scope of the appended claims.

Systems and methods for autonomous driving are provided. An autonomy computing system of an autonomous vehicle perceives the environment in which the autonomous vehicle operates and controls operation of the autonomous vehicle in the environment. In a typical autonomy computing system, the autonomy computing system perceives the environment based on sensor data and generates control policies for controlling operation of the autonomous vehicle based on the perceptions, where detecting perceptions and generating control policies are performed separately. As used herein, perceptions collectively refer to any perceptions, predictions, planning, or any other parameters or characteristics in the environment needed in generating control policies used in controlling the operation of the autonomous vehicle. Example perceptions include road or lane segmentations, traffic signs, objects and classes of the objects, and predictions of trajectories of the objects. In a typical autonomy computing system, the autonomy computing system includes blocks of neural network model, such as blocks of neural network model for generating different perceptions and one or more blocks of neural network model for generating control policies. For example, for predicting perceptions, the autonomy computing system includes a neural network model for predicting road features and masks for road and lane segmentation, a neural network model for traffic sign detection and classification, a neural network model for predicting behavior of pedestrians, and so on. The typical autonomy computing system first starts with perceiving or sensing features in the environment, such as generating bounding boxes of traffic signs and classifications of objects. The features are fed into a separate neural network model that takes all the output features and assigns control policies based on the features. The sequential method of autonomous driving is not optimal in providing a cohesive solution because different perceptions are determined separately and control policies are determined, based on perceptions, separately from detection of perceptions, while the environment is the same environment for determination of perceptions and control policies. As a result, the neural network models may behave unpredictably. Further, because different predictions are performed separately, typical autonomy computing systems may have reduced efficiency.

In some typical autonomy computing systems, control policies are generated using rule-based mechanisms, and/or stateful systems. The analytical methods may be provided as the fallbacks of the neural network methods. The analytical methods need extensive analysis and simulation of real-world driving, but still may fail in certain scenarios of real-world driving, because real-world driving is full of unpredictability.

In contrast, systems and methods described herein address the above-described problems by providing multi-task learning of the autonomy computing system. The autonomy computing system is an end-to-end machine learning model, where perception and control are performed by the machine learning model. Perceptions and control policies are predicted in parallel, and are based on same features detected in the environment, where the control policies are generated based on the features, besides the perception outputs. The resources are shared and the machine learning model is provided with a global view of the perceptions and the control policies, thereby increasing the efficiency and robustness of the system. Predicting perceptions and control policies in parallel is also advantageous in saving computation because knowledge is shared such that all components learn to predict what is needed from each different task. The inputs to the autonomy computing system include historical sensor data and historical control policies acquired or generated by the autonomy computing system immediately before the present time point, and include data in addition to sensor data of the present time point, unlike in typical autonomy computing systems, where the inputs are limited to sensor data, and perhaps even limited to sensor data of the present time point. As used herein, the present time point refers to the time instant when the autonomy computing system determines control policies for the autonomous vehicle. Historical sensor data and historical control policies serve as prior knowledge for predicting control policies of the present time point, thereby increasing the efficiency and reliability in predicting control policies. Historical sensor data, sensor data at the present time point, and historical control policies are represented in a positional encoding vector, which is input into a shared encoder to generate features in the environment. The shared encoder among different modalities of sensors and historical control policies reduces complexity of the machine learning model while having increased knowledge from the sharing, thereby reducing the demand on memory and computation power while increasing the accuracy in predicting features.

A decoder of the systems and methods described herein may include a mixture of experts to reduce the size of the machine learning model while being enabled to handle edge cases and/or complex scenarios. Attention may be used in systems and methods described herein to enable processing a relatively large amount of data without compromising the performance of prediction, where attention facilitates the autonomy computing system to selectively focus on features in the environment having relatively high levels of importance. Attention are weights that indicate relative importance of a component in a sequence with other components in the sequence. Attention also increases the scalability of the autonomy computing system, where a drastic increase in the amount of data and sizes of the machine learning model does not become an impediment to the performance of the autonomy computing system. The training of the autonomy computing system is performed in stages, thereby increasing convergence. A multi-agent system may be included in the systems and methods described herein for developing the autonomy computing system in handling edge cases in a simulated environment resembling the real world, thereby improving the performance of the autonomy computing system without incurring costs and risks from edge cases in real-world data even if real-world data of edge cases are available.

Figure 2:
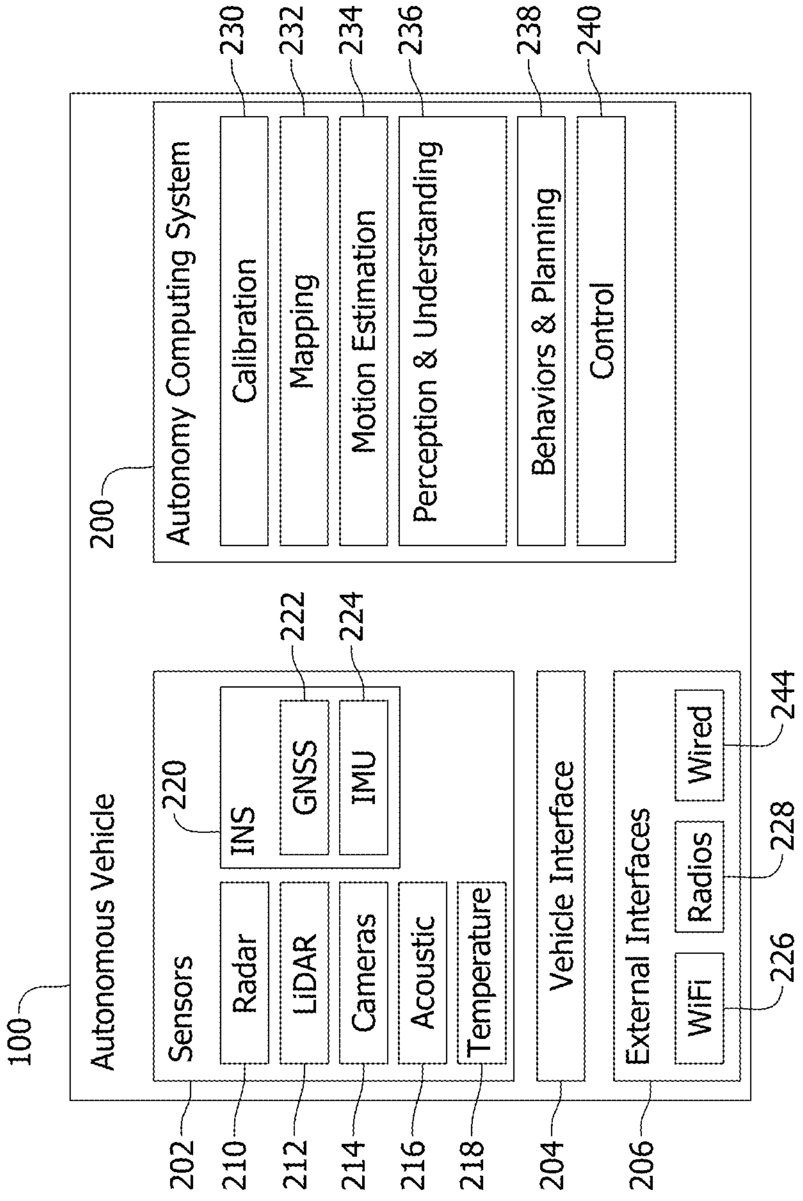
FIG. 2 is a block diagram of an autonomous vehicle.

FIG. 1 is a schematic diagram of an autonomous vehicle 100. FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (radar) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operation of autonomous vehicle 100.

Cameras 214 may include RGB cameras, which are configured to capture images based on visible light. Cameras 214 may further include a gated camera, such as gated near infrared (NIR) camera. A gated camera is configured to capture images based on invisible light, such as NIR light. Cameras 214 are configured to capture images of the environment surrounding autonomous vehicle 100 in any aspect or field of view (FOV). The FOV can have any angle or aspect such that images of the areas in front of, to the side of, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be stitched or combined to generate a visual representation of the multiple cameras'FOVs, which may be used to, for example, generate a bird's eye view of the environment surrounding autonomous vehicle 100. In some embodiments, the image data generated by cameras 214 may be sent to autonomy computing system 200 or other aspects of autonomous vehicle 100, and this image data may include autonomous vehicle 100 or a generated representation of autonomous vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas in front of, to the side of, behind, above, or below autonomous vehicle 100 can be captured and represented in the LiDAR point clouds. Radar sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around autonomous vehicle 100.

GNSS receiver 222 is positioned on autonomous vehicle 100 and may be configured to determine a location of autonomous vehicle 100, which it may embody as GNSS data, as described herein. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, and or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, and a control module or controller 240. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

Autonomy computing system 200 of autonomous vehicle 100 may be completely autonomous (fully autonomous), semi-autonomous, or with any level of autonomy. In one example, autonomy computing system 200 can operate under Level 5 autonomy (e.g., full driving automation), Level 4 autonomy (e.g., high driving automation), Level 3 autonomy (e.g., conditional driving automation), Level 2 autonomy (e.g., partial driving automation), or Level 1 autonomy (e.g., driver assistance). As used herein the term "autonomous" includes fully autonomous, semi-autonomous, or having any level of autonomy.

Figure 3:
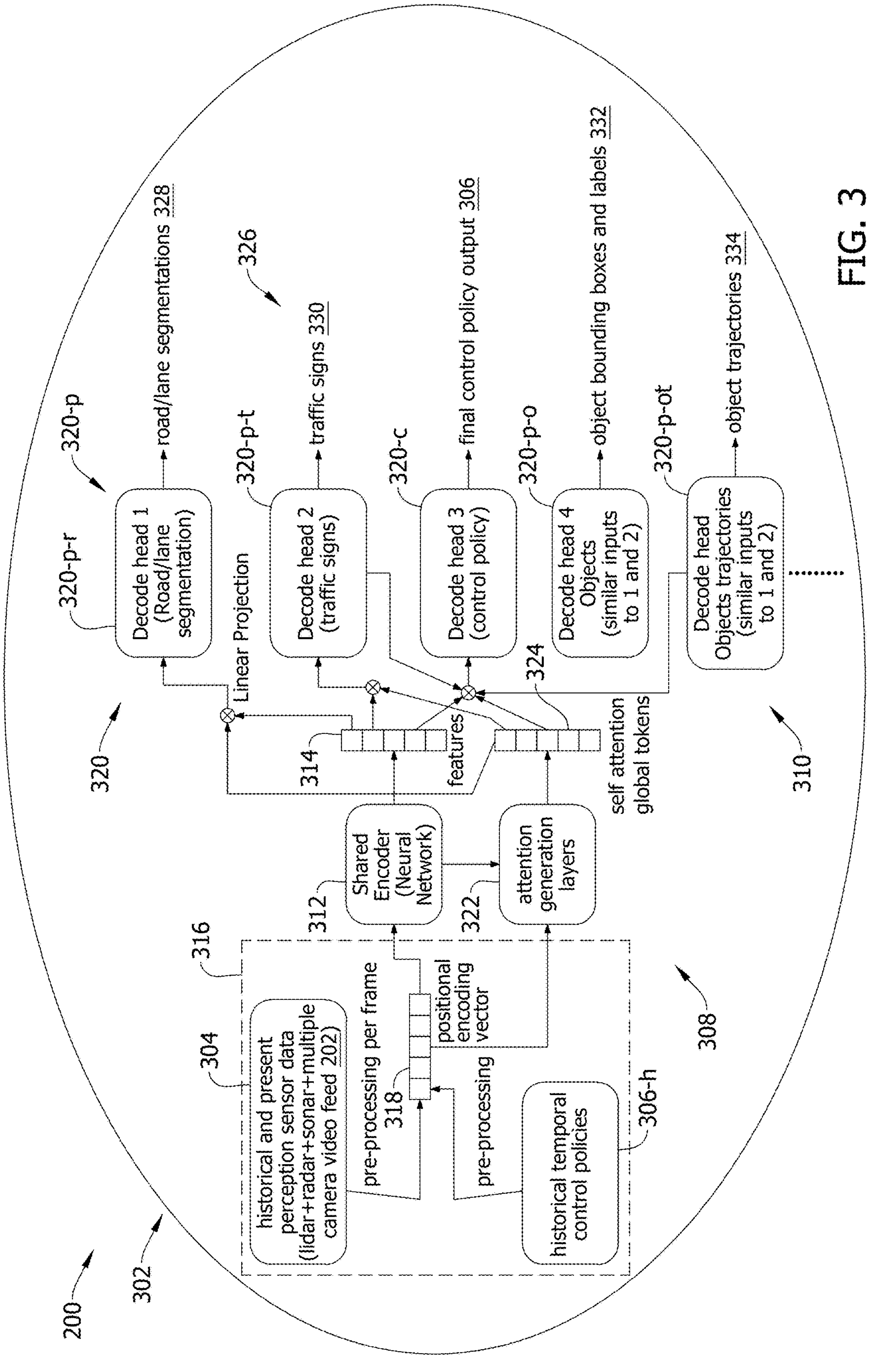
FIG. 3 is a high-level block diagram of an example autonomy computing system of autonomy vehicle shown in FIGS. 1 and 2.
Figure 4B:
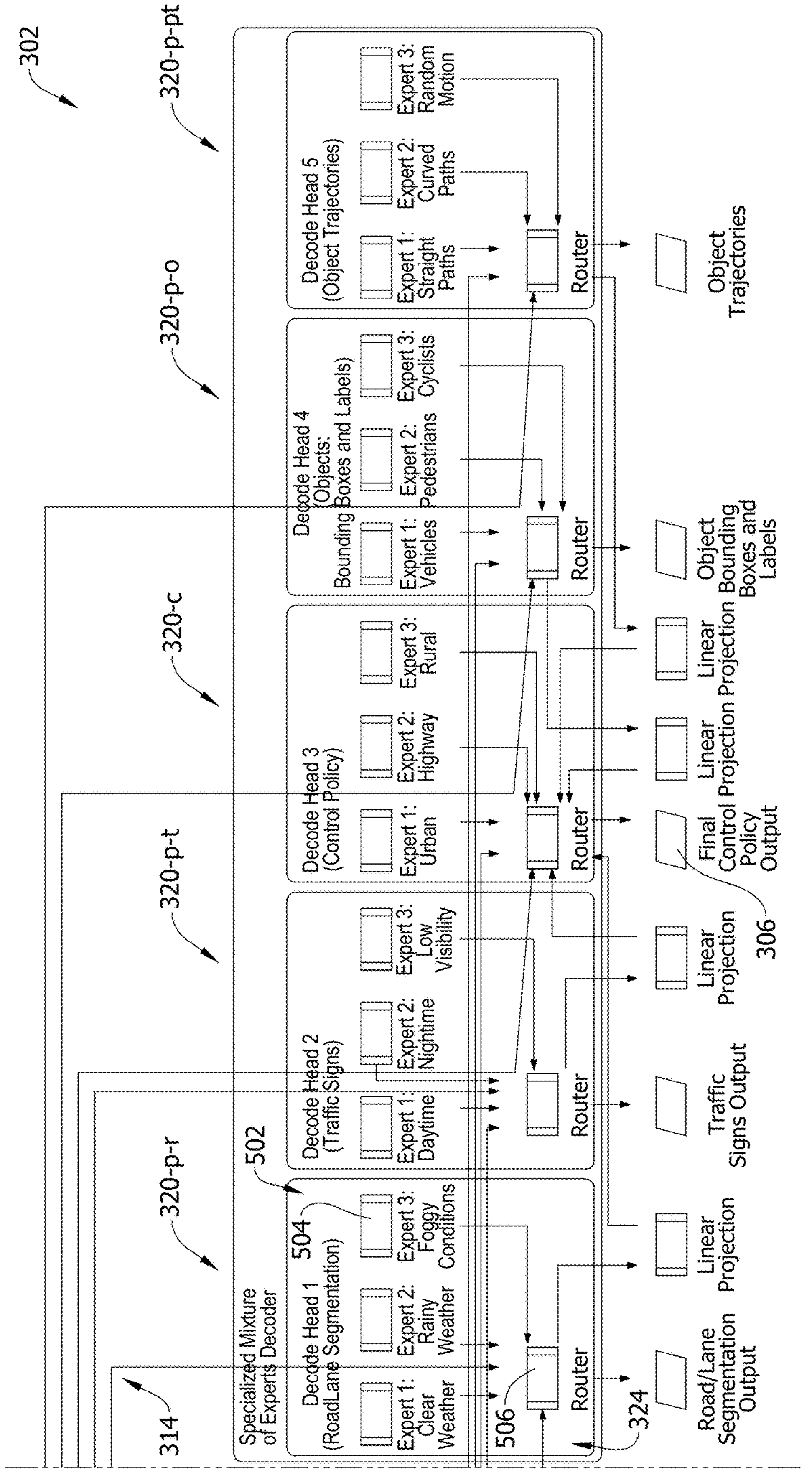

FIGS. 3-4B show an example architecture of autonomy computing system 200. FIG. 3 is a schematic diagram of autonomy computing system 200 at a high level. FIGS. 4-4B show a schematic diagram of autonomy computing system 200 with increased details from FIG. 3, where FIG. 4 is an index figure of partial views FIGS. 4A and 4B, and shows the approximate relationship between FIGS. 4A and 4B. In the example embodiment, autonomy computing system 200 is implemented as an end-to-end machine learning model of autonomous driving machine learning model 302, where autonomous driving machine learning model 302 is configured to take sensor data of the environment as inputs and generate control policies 306 to control operation of autonomous vehicle 100 in the environment. Autonomous driving machine learning model 302 includes an encoder stage 308 and a decoder stage 310. Features are detected at encoder stage 308 and perceptions and control policies are generated at decoder stage 310 based on the features.

In the example embodiments, encoder stage 308 includes an encoder 312 that is configured to generate features 314 in input data.

In the example embodiments, encoder stage 308 further includes a pre-processing module 316. Pre-processing module 316 is configured to pre-process sensor data 304 and historical control policies 306-*h* and generate a positional encoding vector 318 based on sensor data 304 and historical control policies 306-*h*. Sensor data 304 include sensor data 304—at the present time point and historical sensor data 304 acquired at a period of time before the present time point. Sensor data 304 are data acquired by sensors 202 (also see FIG. 2), such as images captured by cameras, LiDAR point clouds from LiDAR sensors 202, and radar point clouds from radar sensors 202. Sensor data 304 are arranged in frames. A frame is an instance of the environment around autonomous vehicle 100 at a time point. A frame may represent sensor data 304 from different modalities as a semantic grid at the time point. A semantic grid may be in 3D, where objects in the environment are presented in the 3D grid representation of the environment, with semantic information about the objects, such as classes of the objects, and location information about the objects. A class of an object refers to the classification and/or subclassification of the object, such as a dynamic object like a vehicle, a pedestrian, or a cyclist, or a static object like a temporary barrier. Sensor data 304 may be represented as positional encoding vector 318. Positional encoding vector 318 is a temporal series of frames. The duration of the temporal series may be 8 seconds(s). Other duration of the temporal series may be used to enable the systems and methods to function as described herein. For example, if the duration of the temporal series is 8 s and each second includes 60 frames, the positional encoding vector 318 may be represented as a vector of 480 dimensions, each dimension corresponding to a time point and having a component at that dimension as the frame at the time point. The order of dimensions may be chronological, with the earliest frame as the first dimension, or reverse chronological, with the latest frame as the first dimension.

In the example embodiments, historical control policies 306-*h* are pre-processed by pre-processing module 316. Historical control policies 306-*h* are control policies generated by autonomy computing system 200 in the past, such as at time points before the present time point. Following the example above, for a duration of 8 s, historical control policies 306-*h* are control policies generated in the past 8 s, excluding the present time point, because the control policies for the present time point are being generated by autonomy computing system 200. Historical control policies 306-*h* are processed by associating historical control policies 306-*h* of a frame with sensor data 304 of the corresponding frame and generating an updated positional encoding vector 318. In updated positional encoding vector 318, each frame, except for the frame corresponding to the present time point, includes sensor data 304 and control policies 306 at the time point corresponding to the frame. In one example, historical control policies 306-*h* are associated with sensor data by adding control policies 306 as one more dimension in positional encoding vector 318. For example, sensor data of a frame are represented in a 3D semantic grid, and historical control policies 306-*h* of that frame are represented as one more dimension in the 3D semantic grid that includes historical control policies of that frame, besides the semantic and location information of the objects of that frame. In another example, historical control policies 306-*h* are associated with sensor data 304 as a weighted addition of sensor data 304 and historical control policies 306-*h*. An activation function, such as a softmax function, may be used in addition to limit the range, such as between 0 and 1 or between −1 and 1. The weights in addition may be adjusted during training of autonomy computing system 200.

In the example embodiments, positional encoding vector 318 is input into encoder 312. Encoder 312 is shared among different modalities of sensor data 304 and historical control policies 306-*h*, where a common backbone of the machine learning model of encoder 312 is used. A shared encoder 312 is advantageous in reducing the size and the complexity of the machine learning model by sharing the backbone in detecting features in sensor data of different modalities and control policies, thereby reducing demand in memory and computation power. A shared encoder 312 is also advantageous in increasing the reliability in detecting features, because encoder 312 is provided with increased, potentially complementary knowledge from different modalities of sensor data and historical control policies. Including historical sensor data and historical control policies in positional encoding vector 318 for encoder 312 is advantageous in increasing robustness of detected features 314 because historical sensor data 304 and historical control policies serve as prior knowledge for encoder 312 on information of changes in the environment and the sensing world. Instead of detecting features only based on sensor data at the present time point in typical autonomy computing systems, encoder 312 detects features based on sensor data at the present time point added with the prior knowledge. Prior knowledge provides a basis to determine optima with increased speed and accuracy in detecting features.

In the example embodiments, encoder stage 308 further includes attention tokens to increase convergence in training and scalability of autonomy computing system 200. The input data, such as positional encoding vectors, are a relatively large dataset. Training autonomy computing system 200 also require a relatively large amount of data. Attention tokens facilitate autonomy computing system 200 to keep all the data in the memory during computation while providing representation of features and the environment with relatively high fidelity by selectively focusing on specific features according to the levels of importance represented by attention tokens during decoding by decoders 320. With attention, despite the sheer large size of data, convergence of autonomy computing system 200 during training is increased or enabled. Further, with attention, the scalability of autonomy computing system 200 is increased, where the performance of the autonomy computing system of an increased size and complexity remains comparable with the autonomy computing system before the increase in size and complexity. Increased scalability is advantageous in drastically improving the performance of the autonomy computing system by having a machine learning model of increased size and complexity and selectively focusing on specific parts in the input data that have relatively high levels of importance.

In the example embodiments, autonomy computing system 200 further includes one or more attention generation layers 322. Attention generation layers 322 are configured to generate attention tokens 324 based on positional encoding vector 318. Attention tokens 324 include weights, such as queries, keys, and values, that indicate relative importance of a component in a sequence with other components in the sequence. Attention tokens 324 may include self-attention tokens, where attention tokens are determined based on a sequence itself, such as a positional encoding vector 318. Attention tokens 324 may also include cross attention tokens, where attention tokens are determined based on a sequence and another sequence, such as a positional encoding vector 318 with another positional encoding vector 318, positional encoding vector 318 with a variation of positional encoding vector 318, or variations of positional encoding vector 318 with one another. Attention tokens 324 may be global, where attention is determined based on the entire sequence and/or all cells in the semantic grids of frames in positional encoding vector 318. In some embodiments, attention tokens 324 may be local or of a region in the sequence or of cells in the semantic grids of frames.

In the example embodiments, decoder stage 310 further includes a plurality of decoders 320 (FIGS. 3 and 4B). The plurality of decoders 320 includes a control policy decoder 320-*c* and one or more perception decoders 320-*p*. Perception decoder 320-*p*, such as road segmentation decoder 320-*p-r*, traffic sign decoder 320-*p-t*, object decoder 320-*p-o*, and object trajectory decoder 320-*p-ot*, are examples for illustration purposes only. Other perception decoders 320-*p* may be included in autonomy computing system 200 that enable autonomy computing system 200 to function as described herein. Perception decoders 320-*p* are configured to generate perceptions 326 of the environment, in which autonomous vehicle 100 is operating. Perceptions 326 may include road or lane segmentations 328 output from road segmentation decoder 320-*p-r*, traffic signs 330 output from traffic sign decoder 320-*p-t*, object bounding boxes and/or labels 332 output from object decoder 320-*p-o*, and object trajectories 334 output from object trajectory decoder 320-*p-ot*.

In the example embodiments, perceptions 326 are used in generating control policies 306 that control the operation of autonomous vehicle 100. Example control policies 306 are control policies of operation, such as steering, traveling trajectories, and speed of autonomous vehicle 100 (see FIGS. 1 and 2). Outputs from perception decoders 320 are included as inputs to control policy decoder 320 (see FIGS. 3 and 4B). In FIG. 3, for clarity of the figure, not all connections between perception decoder 320 and control policy decoder 320 are depicted. Besides perceptions, features 314 output from encoder 312 are input into control policy decoder 320 such that control policies 306 are predicted based on the same features as perceptions, thereby increasing efficiency and accuracy in predictions.

In the example embodiments, attention tokens 324 are input into decoders 320. For example, perception decoder 320 is configured to take features 314 and attention tokens 324 as inputs and generate perceptions based on features 314 and attention tokens 324. Control policy decoder 320 is configured to take features 314, attention tokens 324, and perceptions 326 as inputs, and generate control policies 306 at the present time point based on features 314, attention tokens 324, and perceptions 326. The combination of inputs may be performed by a linear projection, such as a softmax operation (denoted as ⊗ in FIG. 3).

Figure 5:
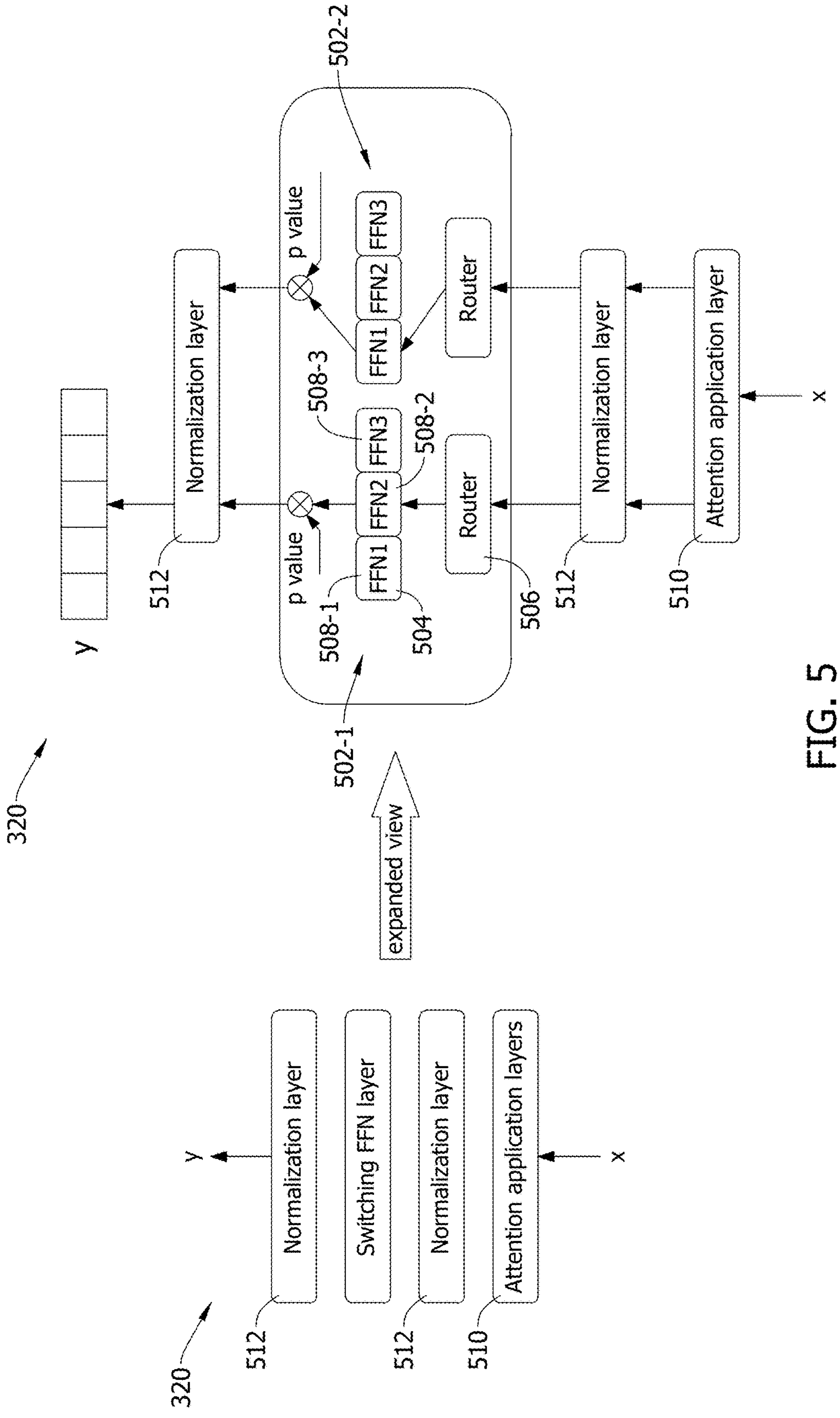
FIG. 5 is a schematic diagram of a decoder in autonomy computing system shown in FIGS. 2-4B.

FIG. 5 shows an example architecture of decoder 320 that includes a mixture of experts 502. In the example embodiments, decoder 320 includes one or more mixtures of experts 502. An expert is a machine learning model trained to perform a specific task. For example, expert 504 may be trained for detecting traffic signs in daytime. An expert may be trained to handle one or more specific edge cases. Using a mixture of experts is advantageous in handling edge or complex scenarios, without having a relatively large size of machine learning model. Because each expert is trained to perform a specific task, the expert may be implemented with a machine learning model having a relatively small size. Mixture of experts 502 includes a plurality of experts 504, where each expert handles a specific task. For example, a mixture of experts 502 includes three experts 504, where the first expert 504 is trained to detect traffic signs in daytime, the second expert 504 is trained to detect traffic signs at nighttime, and the third expert 504 is trained to detect traffic signs under low visibility (also see FIG. 4B).

In the example embodiments, decoder 320 further includes one or more routers 506. One router 506 may be associated with one mixture of experts 502. Router 506 is a machine learning model. In some embodiments, router 506 is a neural network model. Router 506 is learned or trained to parameterize the number of experts and the structure of the machine learning models in mixture of experts 502. Router 506 is trained with a loss function that enforces the specific task that expert 504 performs. For example, experts 504 are trained for handling traffic signs under various visibility, and router 506 is trained to direct or route to specific expert 504 in mixture of experts 502 to detect traffic signs, based on the visibility.

In the example embodiments, decoder 320 may include a plurality of mixtures of experts 502. For example, decoder 320 is a traffic sign decoder and trained in generating traffic signs (y) based on inputs (x) to decoder 320. Decoder 320 includes two mixtures of experts 502-1, 502-2. Mixture of experts 502-1 may be trained to specialize in detecting traffic signs under various visibility, while mixture of experts 502-2 may be trained to specialize in detecting traffic signs in various weather conditions. In some embodiments, expert 504 in mixture of experts 502 may itself include a mixture of experts 502. For example, expert 504 is trained to detect traffic signs in daytime. Expert 504 includes a mixture of experts 502, where one expert 504 is trained to detect traffic signs in daytime with signs in English and another expert 504 is trained to detect traffic signs in daytime with signs including language other than English.

In the depicted example in FIG. 5, an expert 504 is implemented with a feed-forward network (FFN) 508. An FFN is a relatively small neural network model, which include a relatively few number of weights in the neural network model. The size of FFN is relatively small because FFN 508 is trained to perform a specific task. FFNs in a mixture of experts 502 may have the same architecture, such as having the same number of neurons and same layout and connections of the neurons. FFNs 508 in a mixture of experts 502 may be trained to perform a specific task under different scenarios. For example, FFN 508-1 is trained in predicting traffic signs in daytime, FFN 508-2 is trained in predicting traffic signs in nighttime, and FFN 508-3 is trained in predicting traffic signs under low visibility. Therefore, instead of using a complex neural network model, edge cases and/or complex scenarios are handled by a system of a reduced size and complexity by using FFNs of relatively small sizes and of the same architecture. Three FFNs 508 are depicted as examples for illustration purposes only. The number of FFNs in a mixture of experts 502 may be any number that enable autonomy computing system 200 to function as described herein.

In the example embodiments, besides selecting specific expert 504 at the input end, router 506 may be connected to outputs of selected expert 504 to determine the outputs from selected expert 504. The output from selected expert 504 may be weighted by a confidence level (or p value) of selected expert 504 in predicting the specific function.

In the example embodiments, decoder 320 further includes one or more attention application layers 510. Inputs x to decoder 320 include attention tokens 324 (see FIGS. 3-4B) generated by attention generation layers 322 in encoder stage 308. Based on the attention tokens 324, attention application layers 510 apply attention or adjust focus to inputs x.

In the example embodiments, decoder 320 may further include one or more normalization layers 512 before inputs to mixture of experts 502 and/or after outputs from mixture of experts 502. Normalization layer 512 is configured to normalize data to be in a desired range.

Figure 6:
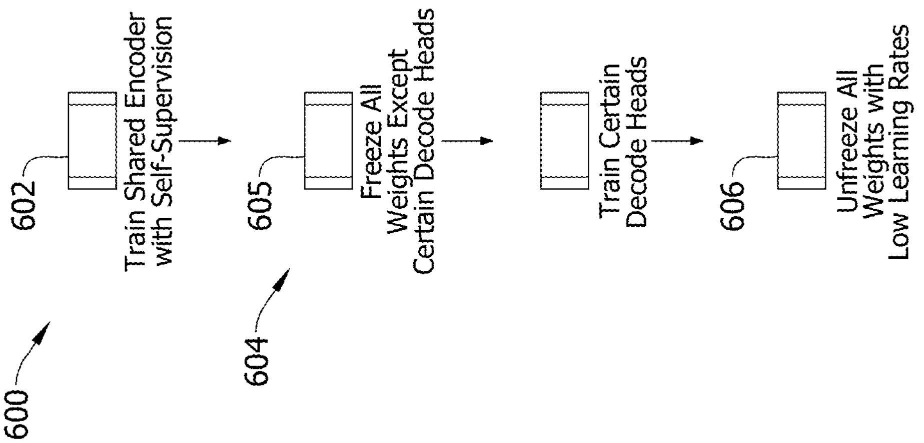
FIG. 6 is a flow chart of an example method of training autonomy computing system shown in FIGS. 2-5.

FIG. 6 is a schematic diagram of an example method 600 of training autonomy computing system 200. A typical end-to-end autonomy computing system may experience difficulty in convergence during training because of the relatively large size of the machine learning model, and interdependence among subblocks in the machine learning model. In the example embodiment, training 600 of the autonomous driving machine learning model is performed in multiple stages. A machine learning model, e.g., encoder 312, in autonomous driving machine learning model 302 that does not receive outputs from other machine learning models as inputs may be trained first. When the machine learning model(s) upon which a machine learning model relies are trained, the machine learning model itself is trained. For example, a perception decoder 320 is trained when encoder 312 has been trained. Control policy decoder 320 is trained last. When training an individual machine learning model, the weights of the individual machine learning model are adjusted, while weights of other machine learning models of autonomous driving machine learning model 302 are frozen or unadjusted. Once all machine learning models have been individually trained, autonomous driving machine learning model 302 is trained as a whole to fine-tune autonomous driving machine learning model 302. In such a scenario, all weights in autonomous driving machine learning model 302 are unfrozen or adjusted during training.

In the depicted embodiment, the encoder is first be trained 602. Encoder 312 may be trained with self-supervision, such as optimizing optical flow in detected features from iteration to iteration. In some embodiments, encoder 312 is trained using supervised or semi-supervised training, such as being training with training data at least partially labelled or provided with ground truth. During training, the weights of encoder 312 are adjusted, while weights of the rest of autonomous driving machine learning model 302 are frozen.

In the example embodiment, after encoder 312 is trained, each perception decoder 320 is trained 604 one at a time. Because perception decoders 320 receive inputs from encoder 312, perception decoders 320 are trained after encoder 312 is trained. In some embodiments, perception decoder 320 also receives inputs from attention generation layers 322. Perception decoders 320 are trained after attention generation layers 322 have also been trained. During training of attention generation layers 322, the weights of attention generation layers 322 are adjusted, while weights of the rest of autonomous driving machine learning model 302 are frozen.

In the example embodiment, perception decoders 320 are trained one by one. In training one specific perception decoder 320, all other weights in autonomous driving machine learning model, except for weights of specific perception decoder 320, are frozen 605 during the training. Weights of specific perception decoder 320 are adjusted during training. Training of specific perception decoder 320 may be supervised, semi-supervised, or self-supervised.

In the example embodiment, because control policy decoder 320 receives outputs from perception decoders 320, after perception decoders 320 are trained, control policy decoder 320 is trained. Like training specific perception decoder 320, control policy decoder 320 is trained by freezing all weights in autonomous driving machine learning model 302, except for weights of control policy decoder 320, such that the optima of weights in control policy decoder 320 are estimated relatively quickly.

In the example embodiment, after decoders 320 are trained, the weights of autonomous driving machine learning model 302 are fine-tuned 606 by training autonomous driving machine learning model 302 at the same time that all weights in autonomous driving machine learning model 302 are unfrozen or adjustable during the training. The rates of learning in fine-tuning 606 may be relatively low, such that the convergence and stability of autonomy computing system 200 are maintained, while autonomy computing system 200 is being fine-tuned.

Figure 7:
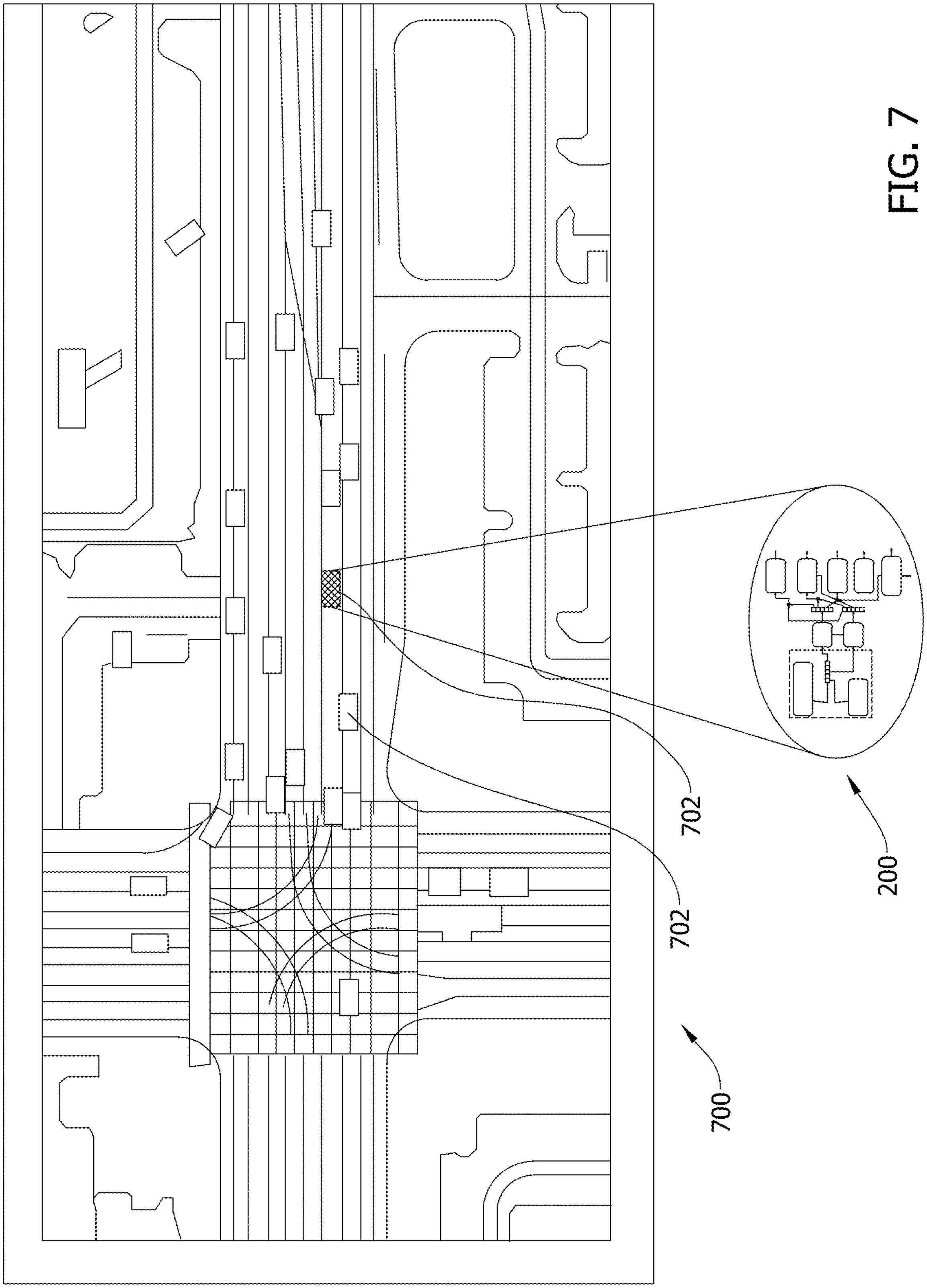
FIG. 7 is a schematic diagram of an example multi-agent system that includes an autonomy computing system shown in FIGS. 2-6.

FIG. 7 is a schematic diagram of an example multi-agent system 700. In the example embodiment, multi-agent system 700 includes a plurality of agents 702. Agents 702 are actors in a real-world environment, such as one or more autonomy computing systems 200 of autonomous vehicle 100, autonomy computing systems of other autonomous vehicles, passenger cars, pedestrians, or cyclists. Multi-agent system 700 is used to test performance of autonomy computing system 200 under edge cases, which are scenarios having a relatively low likelihood of occurrence but may result in relatively severe damage or risks to the autonomous vehicle, other actors, or the surroundings. For example, an edge case is an erratic driver of a passenger car driving erratically towards the autonomous vehicle. Because of the severe damage or risks and a relatively low likelihood, real-world data on edge cases are not necessarily readily available and may be costly to generate in real-world. Instead, simulated edge cases are generated for multi-agent system 700 for developing autonomy computing system 200. Real-world data if available may also be used in development of autonomy computing system 200. The simulated data may have a focus or exclusivity on edge cases. A plurality of autonomy computing systems 200 may be included in multi-agent system 700. When a plurality of autonomy computing systems 200 are included in multi-agent system 700, individual autonomy computing systems 200 are developed one at a time by freezing weights of other autonomy computing system(s) 200, except for the weights in the individual autonomy computing system 200 that is being developed. Multi-agent system 700 is also used to train and debug autonomy computing system 200 in interacting with other actors in the environment or reacting to real-world like scenarios. Compared to typical methods of developing an autonomy computing system with passive actors in the development dataset, a multi-agent system is advantageous in providing dynamic learning for the autonomy computing system because the autonomy computing system is developed with scenarios closely resembling the real world, where the modalities and actions of actors are actively manipulated and interactions between the actors are tested.

Figure 8:
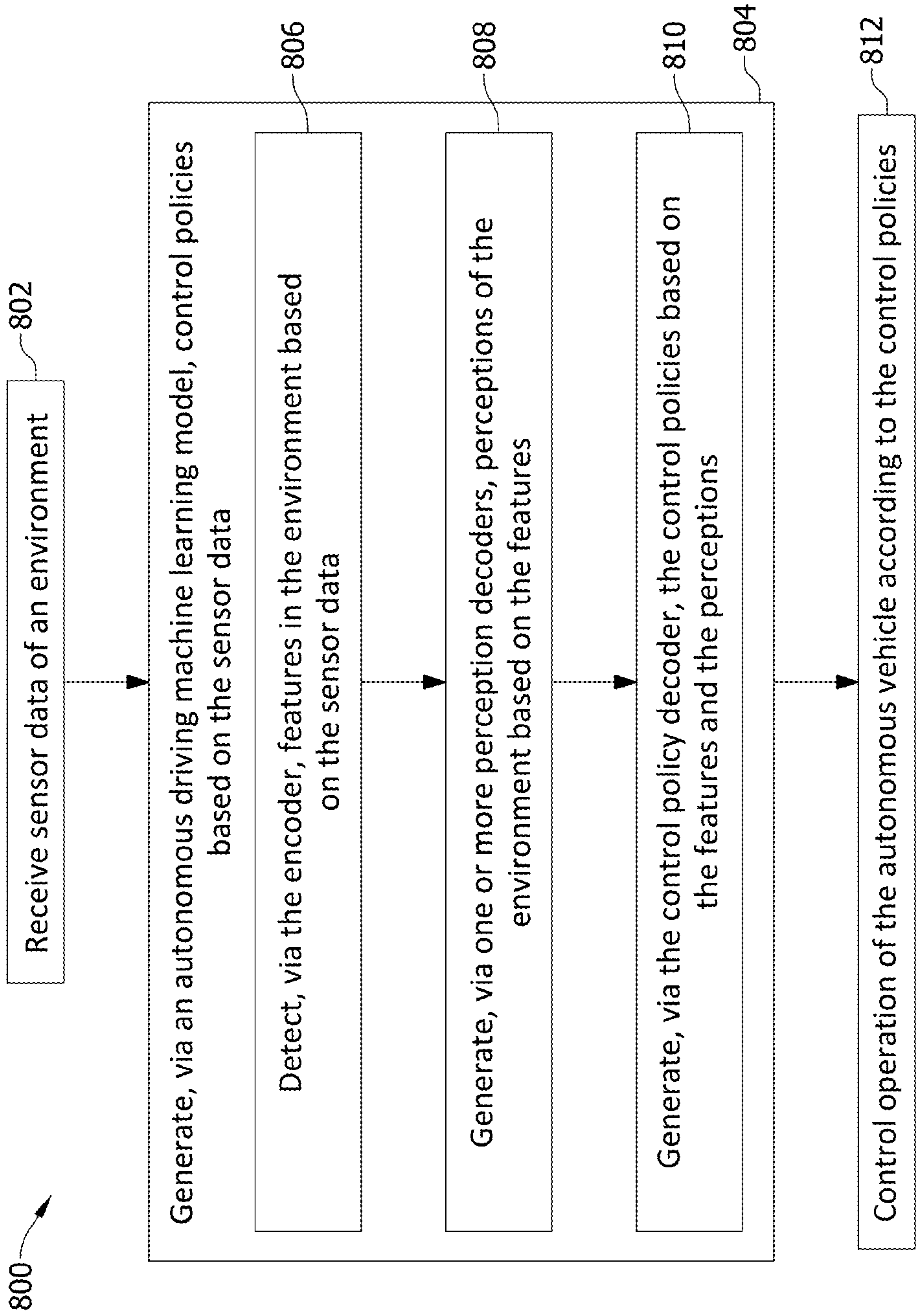
FIG. 8 is a flow chart of an example method for operating an autonomous vehicle.

FIG. 8 is a flow chart of an example method 800 of operating an autonomous vehicle. In the example embodiment, method 800 includes receiving 802 sensor data of an environment in which the autonomous vehicle is operating. Method 600 also includes generating, via an autonomous driving machine learning model, control policies based on the sensor data. Example autonomous driving machine learning models include autonomous driving machine learning model 302 described herein. Generating 804 the control policies includes detecting 806, via an encoder of the autonomous driving machine learning model, features in the environment based on the sensor data. Generating 804 the control policies also includes generating 808, via one or more perception decoders of the autonomous driving machine learning model, perceptions of the environment based on the features. Generating 804 the control policies further includes generating 810, via the control policy decoder of the autonomous driving machine learning model, the control policies based on the features and the perceptions. The control policy decoder is configured to take the features and the perceptions as inputs and output the control policies. In addition, method 600 includes controlling 812 operation of the autonomous vehicle according to the control policies.

Figure 9A:
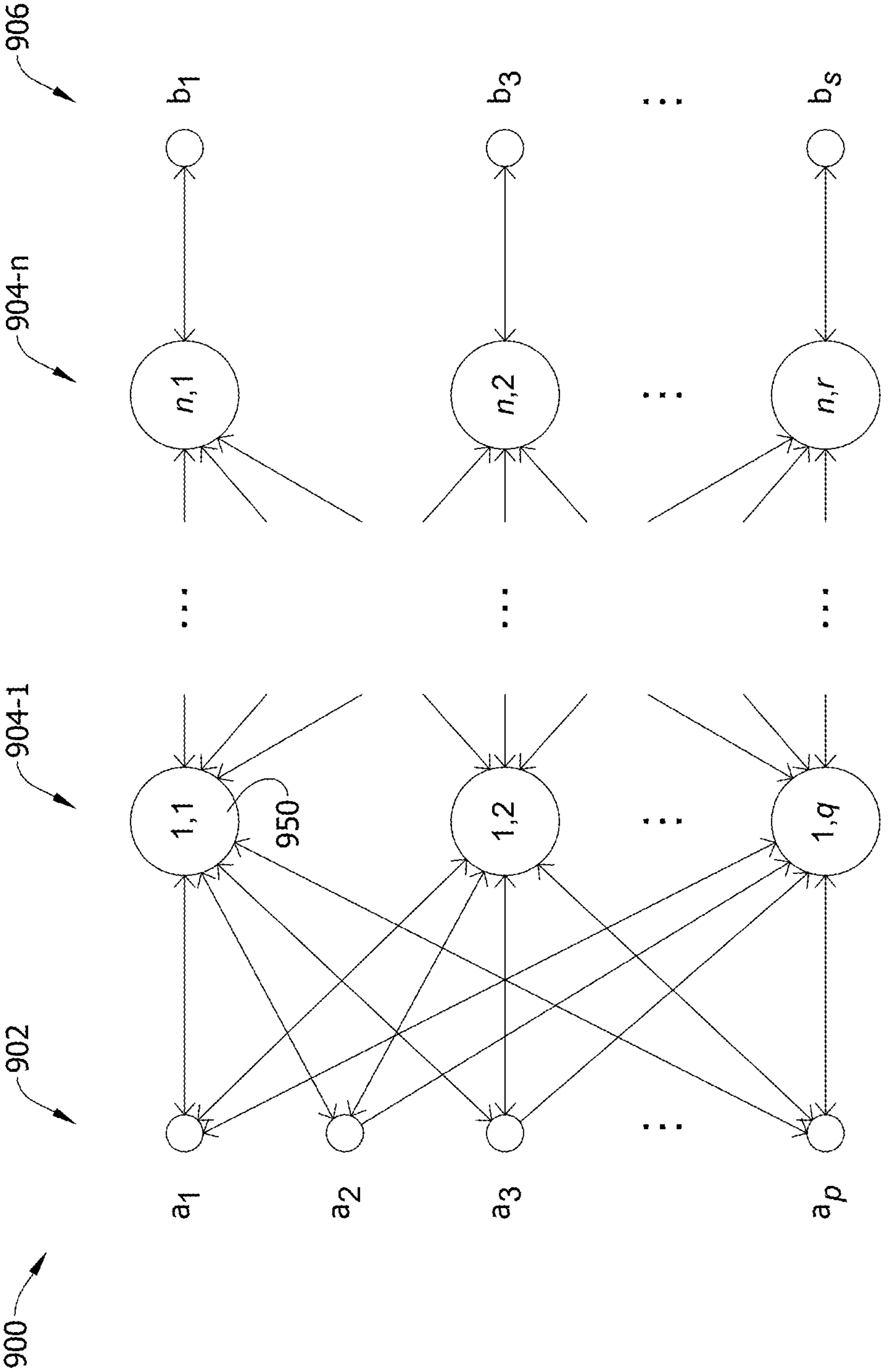
FIG. 9A is a schematic diagram of a neural network model.

FIG. 9A depicts an example artificial neural network model 900. Autonomous driving machine learning model 302 may include one or more neural network models 900. The example neural network model 900 includes layers of neurons 950, 904-1 to **904-*n*, and 906, including an input layer 902, one or more hidden layers 904-1 through 904-*n*, and an output layer 906. Each layer may include any number of neurons, i.e., q, r, and n in FIG. 9A may be any positive integer. It should be understood that neural networks of a different structure and configuration from that depicted in FIG. 9**A may be used to achieve the methods and systems described herein.

In the example embodiment, the input layer 902 may receive different input data. For example, the input layer 902 includes a first input $a_1$ representing training images, a second input $a_2$ representing patterns identified in the training images, a third input $a_3$ representing edges of the training images, and so on. The input layer 902 may include thousands or more inputs. In some embodiments, the number of elements used by the neural network model 900 changes during the training process, and some neurons are bypassed or ignored if, for example, during execution of the neural network, they are determined to be of less relevance.

In the example embodiment, each neuron in hidden layer(s) 904-1 through **904-*n* processes one or more inputs from the input layer 902, and/or one or more outputs from neurons in one of the previous hidden layers, to generate a decision or output. The output layer 906 includes one or more outputs each indicating a label, confidence factor, weight describing the inputs, and/or an output image. In some embodiments, however, outputs of the neural network model 900 are obtained from a hidden layer 904-1 through 904-*n* in addition to, or in place of, output(s) from the output layer(s) 906**.

In some embodiments, each layer has a discrete, recognizable function with respect to input data. For example, if n is equal to 3, a first layer analyzes the first dimension of the inputs, a second layer analyzes the second dimension, and the final layer analyzes the third dimension of the inputs. Dimensions may correspond to aspects considered strongly determinative, then those considered of intermediate importance, and finally those of less relevance.

In other embodiments, the layers are not clearly delineated in terms of the functionality they perform. For example, two or more of hidden layers 904-1 through **904-*n*** may share decisions relating to labeling, with no single layer making an independent decision as to labeling.

Figure 9B:
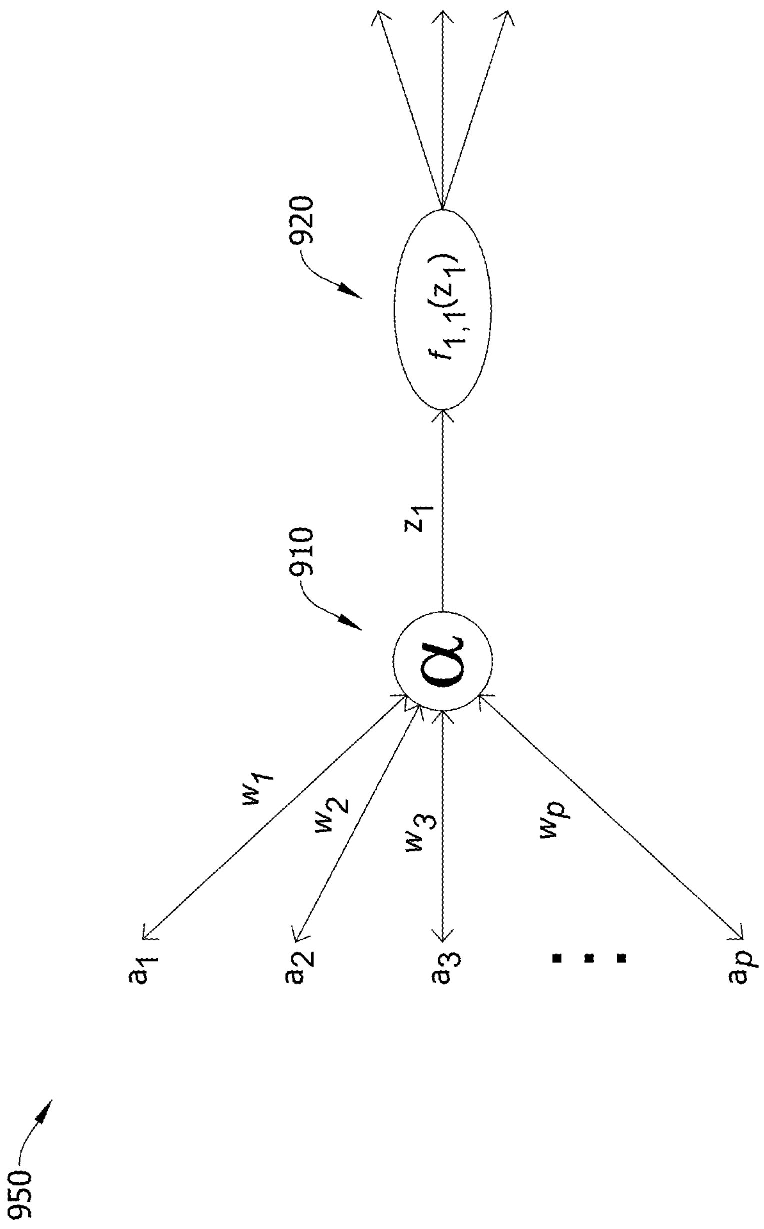
FIG. 9B is a schematic diagram of a neuron in the neural network model shown in FIG. 9A.

FIG. 9B depicts an example neuron 950 that corresponds to the neuron labeled as "1,1" in hidden layer 904-1 of FIG. 9A, according to one embodiment. Each of the inputs to the neuron 950 (e.g., the inputs in the input layer 902 in FIG. 9A) is weighted such that input $a_1$ through $a_p$ corresponds to weights $w_1$ through $w_p$ as determined during the training process of the neural network model 900.

In some embodiments, some inputs lack an explicit weight, or have a weight below a threshold. The weights are applied to a function $\alpha$ (labeled by a reference numeral 910), which may be a summation and may produce a value $z_1$ which is input to a function 920, labeled as $f_{1,1}(z_1)$. The function 920 is any suitable linear or non-linear function. As depicted in FIG. 9B, the function 920 produces multiple outputs, which may be provided to neuron(s) of a subsequent layer, or used as an output of the neural network model 900. For example, the outputs may correspond to index values of a list of labels, or may be calculated values used as inputs to subsequent functions.

It should be appreciated that the structure and function of the neural network model 900 and the neuron 950 depicted are for illustration purposes only, and that other suitable configurations exist. For example, the output of any given neuron may depend not only on values determined by past neurons, but also on future neurons.

The neural network model 900 may include a convolutional neural network (CNN), a deep learning neural network, a reinforced or reinforcement learning module or program, or a combined learning module or program that learns in two or more fields or areas of interest. Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. The neural network model 900 may be trained using unsupervised machine learning programs. In unsupervised machine learning, the processing element may be required to find its own structure in unlabeled example inputs. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics, and information. The machine learning programs may use deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Based upon these analyses, the neural network model 900 may learn how to identify characteristics and patterns that may then be applied to analyzing image data, model data, and/or other data. For example, the model 900 may learn to identify features in a series of data points.

Figure 10:
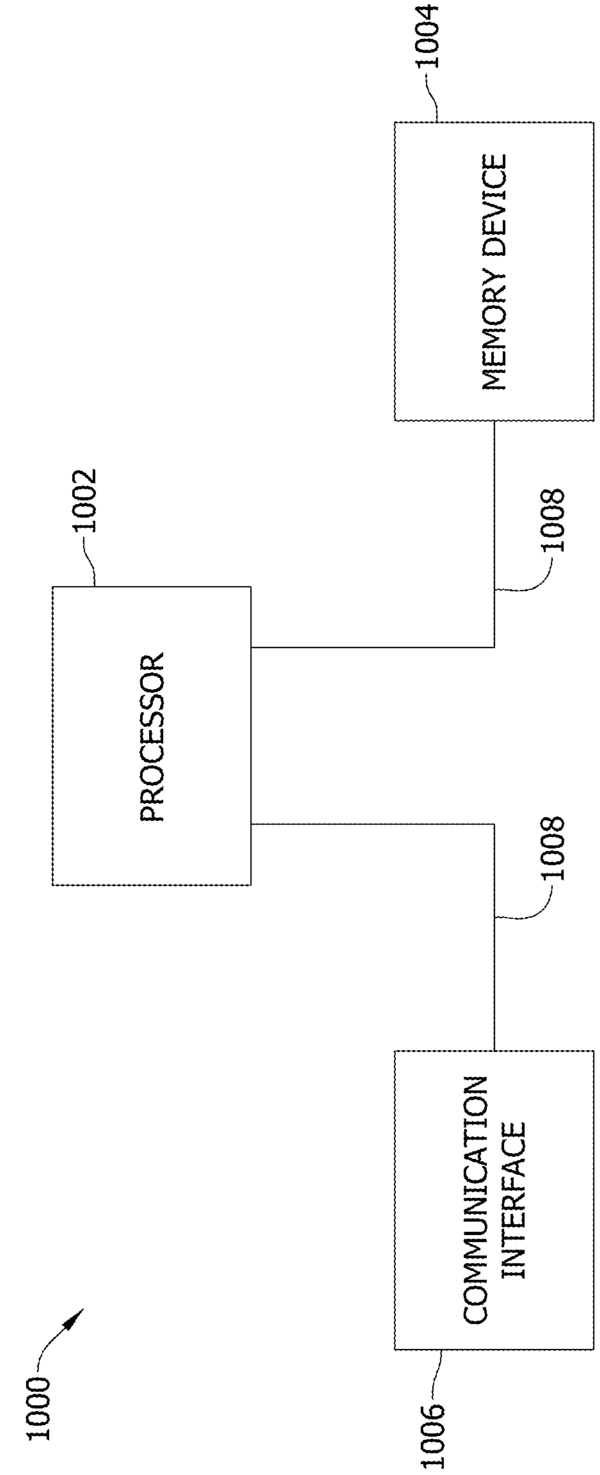
FIG. 10 is a block diagram of an example computing device.

FIG. 10 is a block diagram of an example computing device 1000. Autonomy computing system 200 may be implemented with one or more computing devices 1000. In the example embodiment, computing device 1000 includes a processor 1002 and a memory device 1004. The processor 1002 is coupled to the memory device 1004 via a system bus 1008. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 1004 includes one or more devices that enable information, such as executable instructions or other data (e.g., sensor data), to be stored and retrieved. Moreover, the memory device 1004 includes one or more computer readable media, such as, without limitation, dynamic random access memory (DRAM), static random access memory (SRAM), a solid state disk, or a hard disk. In the example embodiment, the memory device 1004 stores, without limitation, application source code, application object code, configuration data, additional input events, application states, assertion statements, validation results, or any other type of data. The computing device 1000, in the example embodiment, may also include a communication interface 1006 that is coupled to the processor 1002 via system bus 1008. Moreover, the communication interface 1006 is communicatively coupled to data acquisition devices.

In the example embodiment, processor 1002 may be programmed by encoding an operation using one or more executable instructions and providing the executable instructions in the memory device 1004. In the example embodiment, the processor 1002 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample (e.g., training) data sets or certain data into the programs, such as conversation data of spoken conversations to be analyzed, mobile device data, and/or additional speech data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning, such as deep learning, reinforced learning, or combined learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. The unsupervised machine learning techniques may include clustering techniques, cluster analysis, anomaly detection techniques, multivariate data analysis, probability techniques, unsupervised quantum learning techniques, associate mining or associate rule mining techniques, and/or the use of neural networks. In some embodiments, semi-supervised learning techniques may be employed. In one embodiment, machine learning techniques may be used to extract data about the conversation, statement, utterance, spoken word, typed word, geolocation data, and/or other data.

An example technical effect of the methods, systems, and apparatus described herein includes at least one of: (a) a positional encoding vector including sensor data and historical control policies as input to an encoder, thereby increasing the efficiency and robustness of the system, (b) a shared encoder of a common backbone among different modalities of sensors and historical control policies, thereby increasing the efficiency and robustness of the system, (c) attention tokens generated at the encoder stage and applied in decoders, thereby increasing convergence and scalability of the system, (d) a control policy decoder taking features and perceptions as inputs, thereby increasing the efficiency and robustness of the system, (e) a decoder including a mixture of experts, thereby reducing the size and complexity of the system in handling complex scenarios, (f) multi-stage training of the end-to-end autonomy computing system, thereby increasing convergence, and (g) a multi-agent system including one or more autonomy computing systems, thereby improving development of the autonomy computing system in handling edge cases.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable/machine-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. An autonomy computing system of an autonomous vehicle, comprising at least one processor in communication with at least one memory device, the at least one processor programmed to:

receive sensor data of an environment in which an autonomous vehicle is operating;

generate, via an autonomous driving machine learning model, control policies based on the sensor data, the autonomous driving machine learning model including an encoder stage and a decoder stage, the encoder stage including an encoder, the decoder stage including a plurality of decoders, the plurality of decoders including one or more perception decoders and a control policy decoder, wherein the at least one processor is further programmed to generate the control policies by:

detecting, via the encoder, features in the environment based on the sensor data;

generating, via the one or more perception decoders, perceptions of the environment based on the features; and generating, via the control policy decoder, the control policies based on the features and the perceptions, wherein the control policy decoder is configured to take the features and the perceptions as inputs and output the control policies; and control operation of the autonomous vehicle according to the control policies.

2. The autonomy computing system of claim 1, wherein the at least one processor is further programmed to:

generate, via one or more attention generation layers at the encoder stage, attention tokens based on the sensor data; and apply, via one or more attention application layers in the plurality of decoders, the attention tokens in decoding the features.

3. The autonomy computing system of claim 1, wherein the sensor data include sensor data at a present time point and historical sensor data of a period of time before the present time point, the at least one processor further programmed to:

input the sensor data and historical control policies of the period of time before the present time point to the encoder.

4. The autonomy computing system of claim 3, wherein the at least one processor is further programmed to:

generate, via a pre-processing module at the encoder stage, a positional encoding vector by associating the sensor data with the historical control policies; and detect, via the encoder, the features based on the positional encoding vector, wherein the encoder is configured to take the positional encoding vector as an input and generate the features.

5. The autonomy computing system of claim 1, wherein at least one of the plurality of decoders includes a mixture of experts, wherein each expert in the mixture of experts includes a machine learning model trained to perform a specific task.

6. The autonomy computing system of claim 5, wherein the at least one processor is further programmed to:

select, via a router, an expert among the mixture of experts to decode the features, the router including a machine learning model trained to select the expert among the mixture of experts.

7. The autonomy computing system of claim 6, wherein the at least one processor is further programmed to:

apply, via the router, one or more weights to outputs from a selected expert among the mixture of experts, wherein the one or more weights include one or more confidence levels of the selected expert in decoding the features.

8. The autonomy computing system of claim 5, wherein the each expert includes a feed-forward network (FFN) model.

9. The autonomy computing system of claim 1, wherein the autonomous driving machine learning model is trained by:

training the encoder while freezing weights in the rest of the autonomous driving machine learning model;

training the one or more perception decoders one at a time while freezing the weights in the rest of the autonomous driving machine learning model;

training the control policy decoder while freezing the weights in the rest of the autonomous driving machine learning model; and training the autonomous driving machine learning model while weights of the autonomous driving machine learning model are unfrozen.

10. A multi-agent system for developing an autonomous vehicle, the multi-agent system comprising:

a plurality of agents, at least one of the plurality of agents comprising an autonomy computing system of an autonomous vehicle, the autonomy computing system configured to interact with other agents in the plurality of agents, the autonomy computing system comprising at least one processor in communication with at least one memory device, the at least one processor programmed to:

receive sensor data of an environment in which the autonomous vehicle is operating;

generate, via an autonomous driving machine learning model, control policies based on the sensor data, the autonomous driving machine learning model including an encoder stage and a decoder stage, the encoder stage including an encoder, the decoder stage including a plurality of decoders, the plurality of decoders including one or more perception decoders and a control policy decoder, wherein the at least one processor is further programmed to generate the control policies by:

detecting, via the encoder, features in the environment based on the sensor data;

generating, via the one or more perception decoders, perceptions of the environment based on the features; and generating, via the control policy decoder, the control policies based on the features and the perceptions, wherein the control policy decoder is configured to take the features and the perceptions as inputs and output the control policies; and control operation of the autonomous vehicle according to the control policies.

11. The multi-agent system of claim 10, wherein the multi-agent system is trained with edge cases.

12. The multi-agent system of claim 10, wherein the plurality of agents comprise a plurality of autonomy computing systems, wherein one of the plurality of autonomy computing systems is trained while weights in other autonomy computing systems of the plurality of autonomy computing systems are frozen.

13. One or more non-transitory machine-readable storage media for an autonomy computing system of an autonomous vehicle, the one or more non-transitory machine-readable storage media comprising a plurality of instructions stored thereon that, in response to being executed, cause a system to:

receive sensor data of an environment in which an autonomous vehicle is operating;

generate, via an autonomous driving machine learning model, control policies based on the sensor data, the autonomous driving machine learning model including an encoder stage and a decoder stage, the encoder stage including an encoder, the decoder stage including a plurality of decoders, the plurality of decoders including one or more perception decoders and a control policy decoder, wherein the plurality of instructions further cause the system to generate the control policies by:

detecting, via the encoder, features in the environment based on the sensor data;

generating, via the one or more perception decoders, perceptions of the environment based on the features; and generating, via the control policy decoder, the control policies based on the features and the perceptions, wherein the control policy decoder is configured to take the features and the perceptions as inputs and output the control policies; and control operation of the autonomous vehicle according to the control policies.

14. The one or more non-transitory machine-readable storage media of claim 13, wherein the plurality of instructions further cause the system to:

generate, via one or more attention generation layers at the encoder stage, attention tokens based on the sensor data; and apply, via one or more attention application layers in the plurality of decoders, the attention tokens in decoding the features.

15. The one or more non-transitory machine-readable storage media of claim 13, wherein the sensor data include sensor data at a present time point and historical sensor data of a period of time before the present time point, the plurality of instructions further causing the system to:

generate, via a pre-processing module at the encoder stage, a positional encoding vector by associating the sensor data with historical control policies of the period of time before the present time point; and detect, via the encoder, the features based on the positional encoding vector, wherein the encoder is configured to take the positional encoding vector as an input and generate the features.

16. The one or more non-transitory machine-readable storage media of claim 13, wherein at least one of the plurality of decoders includes a mixture of experts, wherein each expert in the mixture of experts includes a machine learning model trained to perform a specific task.

17. The one or more non-transitory machine-readable storage media of claim 16, wherein the plurality of instructions further cause the system to:

select, via a router, an expert among the mixture of experts to decode the features, the router including a machine learning model trained to select the expert among the mixture of experts.

18. The one or more non-transitory machine-readable storage media of claim 17, wherein the plurality of instructions further cause the system to:

apply, via the router, one or more weights to outputs from a selected expert among the mixture of experts, wherein the one or more weights include one or more confidence levels of the selected expert in decoding the features.

19. The one or more non-transitory machine-readable storage media of claim 16, wherein the each expert includes a feed-forward network (FFN) model.

20. The one or more non-transitory machine-readable storage media of claim 13, wherein the autonomous driving machine learning model is trained by:

training the encoder while freezing weights in the rest of the autonomous driving machine learning model;

training the one or more perception decoders one at a time while freezing the weights in the rest of the autonomous driving machine learning model;

training the control policy decoder while freezing the weights in the rest of the autonomous driving machine learning model; and training the autonomous driving machine learning model while weights of the autonomous driving machine learning model are unfrozen.

* * * * *